United States Patent Office 2,898,373
Patented Aug. 4, 1959

2,898,373
STABILIZATION OF PANTHENOL

Heinrich Kläui, Riehen, near Basel, Switzerland, assignor to Hoffmann-La Roche Inc., Nutley, N.J., a corporation of New Jersey No Drawing. Application August 29, 1957
Serial No. 680,909

Claims priority, application Switzerland
September 24, 1956

10 Claims. (Cl. 260—561)

Panthenol (pantothenyl alcohol) solwly decomposes in the presence of water. For that reason, it is desirable to stabilize aqueous solutions of panthenol, especially for the purposes of injection.

It has now been found that panthenol in aqueous solution may be stabilized by the presence of a lactone formed by intramolecular or intermolecular condensation or a poly self ester of a hydroxy carboxylic acid. In order to obtain stable panthenol in the presence of water, according to the present invention, panthenol is admixed with a small quantity of the lactone or the polymeric ester of a hydroxy carboxylic acid.

Preferred stabilizers are lactones formed by intramolecular or intermolecular condensation or poly self esters of unsubstituted or substituted γ-hydroxy-carboxylic acids, especially γ-hydroxybutyric acid or a substituted γ-hydroxybutyric acid. Most preferred, are α-hydroxy-β,β-dimethyl-γ-butyrolactone and γ-butyrolactone. Poly self esters of lactic acid, for example lactyl-lactyl-lactic acid, preferably in solution in lactic acid, may also be used to advantage.

The optical configuration of the stabilizer on the one hand and panthenol on the other hand have no influence on the stabilization of the latter. The racemate or an optically active form of asymmetrically formed lactones or poly self esters may be used for the stabilization of racemic or optically active panthenol. The stabilizer is admixed in the aqueous penthenol solution in an amount equal to approximately 2 to 25 percent by weight of the quantity of panthenol present.

α-Hydroxy-β,β-dimethyl-γ-butyrolactone (pantoyl lactone) is a particularly good stabilizing agent. This stabilizer has the additional advantage that it is the starting material for the synthesis of panthenol and may either be admixed after the panthenol has been synthesized or an excess of the lactone may be utilized in the synthesis of panthenol so that it carries over into the product. The result is the same, namely the stabilization of panthenol by means of pantoyl lactone.

The stabilizers of this invention have an outstanding ability to stabilize aqueous panthenol solutions and give rise neither to turbidity nor to precipitation in such solutions. Furthermore, they are compatible with practically all substances used in combination with panthenol. The stabilized aqueous panthenol solutions prepared according to this invention are especially useful for injection. Panthenol may also be stabilized according to this invention in other conventional panthenol-containing compositions such as vitamin drops, hair oils and other aqueous cosmetic preparations which contain other ingredients.

The following examples are illustrative of the invention.

Example 1

5 g. of D(+)-panthenol were admixed with 0.5 g. DL-pantoyl lactone (α-hydroxy-β,β-dimethyl-butyrolactone). This mixture was added to 94.5 g. of water. After heating for 24 hours at 100° C., the product contained 91 percent undecomposed panthenol.

Example 2

5 g. of D(+)-panthenol were dissolved in 94.5 g. of water. 1.0 g. D(—)-pantoyl lactone were added to the solution. The solution was stored for 12 weeks at 45° C. after which time the panthenol content of the solution was 95 percent of the original quantity.

Example 3

25 g. of DL-panthenol were admixed with 1 g. of DL-pantoyl lactone. The mixture was dissolved in 74 g. of water. The solution was ampulled and sterilized for 20 minutes at 120° C. After the heat sterilization, the solution assayed 99.75 percent of the original quantity of panthenol. After 12 weeks' storage at 45° C., the panthenol content of the solution was 89 percent.

Example 4

5 g. of panthenol were dissolved in 94.5 g. of water and 0.5 g. of γ-butyrolactone were added. After heating the solution for 24 hours at 100° C., 93 percent of undecomposed panthenol was present.

Example 5

25 g. of panthenol, produced by the reaction of pantoyl lactone with 90 percent of the theoretical quantity of amino-propanol, were dissolved in 75 g. of water. The solution contained 95 percent of the original panthenol content after heating for 12 weeks at 45° C.

Example 6

5 g. of panthenol and 0.5 g. of δ-gluconolactone were dissolved in 94.5 g. of water. After heating for 24 hours at 100° C., the solution contained 4.25 g. of undecomposed panthenol.

Example 7

5 g. of panthenol and a solution of 0.05 g. of polymeric lactic acid (predominantly lactyl-lactyl-lactic acid) in 0.45 g. of lactic acid were dissolved in 94.5 g. of water. After heating for 24 hours at 100° C., the solution contained 90% of the original quantity of panthenol.

Example 8

5.35 g. of DL-panthenol with a free pantoyl lactone content of 0.35 g. were dissolved in 94.65 g. of water. The solution, after heating for 24 hours at 100° C., contained 85 percent of the original panthenol content.

I claim:

1. A stabilized aqueous solution comprising panthenol wherein the stabilizer for panthenol is a member of the group consisting of a lactone of a hydroxycarboxylic acid, said lactone containing 4 to 6 carbon atoms in the lactone ring, and polylactic acid.

2. A composition as in claim 1 wherein the amount of stabilizer is about 2 to about 25% by weight of the panthenol.

3. A stabilized aqueous panthenol solution wherein the panthenol is stabilized by the presence of about 2 to about 25% by weight of a 4 to 6 carbon atom lactone of a hydroxycarboxylic acid.

4. A stabilized aqueous panthenol solution wherein the panthenol is stabilized by the presence of about 2 to about 25% by weight of polylactic acid.

5. A stabilized aqueous panthenol solution wherein the panthenol is stabilized by the presence of about 2 to about 25% by weight of pantoyl lactone.

6. A stabilized aqueous panthenol solution wherein the panthenol is stabilized by the presence of about 2 to about 25% by weight of γ-butyrolactone.

7. A stabilized aqueous panthenol solution wherein the panthenol is stabilized by the presence of about 2 to about 25% by weight of δ-gluconolactone.

8. A stabilized aqueous panthenol solution wherein the panthenol is stabilized by the presence of about 2 to about 25% by weight of lactyl-lactyl-lactic acid.

9. A process for stabilizing panthenol in aqueous solution which comprises admixing in water panthenol with a minor amount of a stabilizer selected from the group consisting of a lactone of a hydroxycarboxylic acid, said lactone containing 4 to 6 carbon atoms in the lactone ring, and polylactic acid.

10. A process for stabilizing penthanol in aqueous solution which comprises admixing in water penthanol and about 2 to about 25% by weight of pantoyl lactone.

References Cited in the file of this patent

UNITED STATES PATENTS

| | | |
|---|---|---|
| 2,413,077 | Schnider | Dec. 24, 1946 |
| 2,813,123 | Valentine | Nov. 12, 1957 |

OTHER REFERENCES

Shive et al.: J. Biol. Chem., vol. 160, No. 1, September 1945, p. 287.

Lowy et al.: "Organic Chemistry" (1945), p. 148.